Sept. 27, 1955      J. W. NAWOJSKI      2,718,937
HYDRAULIC BRAKE FOR VEHICLES
Filed Aug. 26, 1954      2 Sheets-Sheet 1

INVENTOR.
JULIUS A. NAWOJSKI
BY *Louis Chayka*
ATTORNEY.

Sept. 27, 1955     J. W. NAWOJSKI     2,718,937

HYDRAULIC BRAKE FOR VEHICLES

Filed Aug. 26, 1954     2 Sheets-Sheet 2

INVENTOR.
JULIUS A. NAWOJSKI.
BY Louis Chayka
ATTORNEY.

United States Patent Office 2,718,937
Patented Sept. 27, 1955

2,718,937
HYDRAULIC BRAKE FOR VEHICLES
Julius W. Nawojski, Roseville, Mich.

Application August 26, 1954, Serial No. 452,308

3 Claims. (Cl. 188—90)

The brakes of my invention are of a type in which liquid, such as oil, is employed as a means of tamping and slowing the rotary movement of the wheels to which the brakes are applied. More specifically, my invention contemplates a combination of parts in such a manner that each wheel which is intended to be subjected to a braking action is connected to and drives a piston rotating about the axis of the wheel, the piston bearing against a quantity of liquid in a confined space. The liquid is disposed in the path of the movement of the piston, the combination of elements of my said invention including means which allow movement of the liquid under pressure.

The object of my invention is to provide a device which will supply means for stopping rotation of the wheels of a vehicle fully, quickly, and yet smoothly.

I shall now describe my improvement with reference to the accompanying drawings in which.

Similar numerals refer to similar parts throughout the several views.

Figure 1:
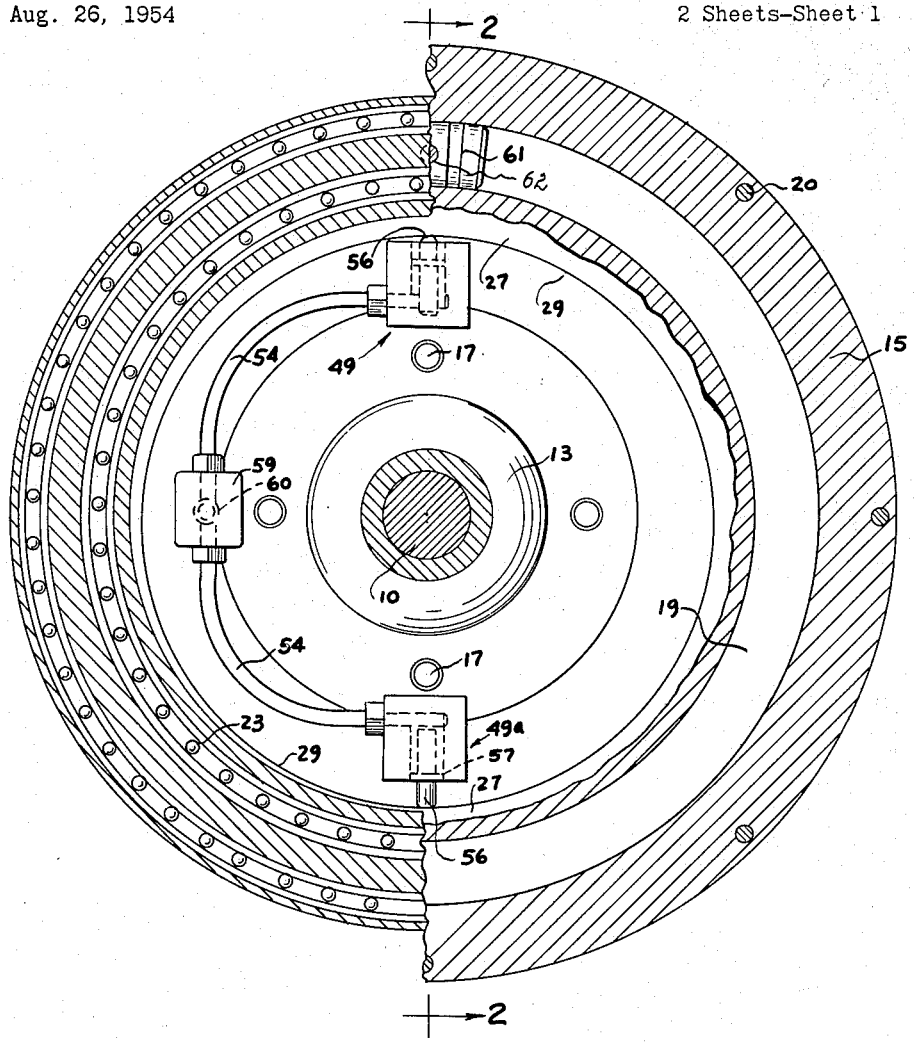
Fig. 1 is a sectional view of the rear wheel mounting of an automobile, the view including my braking means, the figure disclosing said mounting and the braking means in one plane, the details being shown to the left of the vertical line 2—2, and a sectional view of said mounting in another plane parallel to the first one, said sectional view being disposed to the right of line 2—2.

For the purpose of identifying the conventional members of a wheel mounting, I shall refer to a rear axle shaft 10 disposed in a housing 11, while roller bearings for the shaft are indicated by numeral 12. The hub of the wheel is marked 13, and the webbing to which the wheel is bolted is marked 14. Disposed parallel to the webbing, but back of it, is a stationary plate 15, the plate being circular in form and provided with a circular axial aperture adjoining the above-said bearings for the axle. It is this plate to which a flange 16 of the housing, at its outer end, is secured by means of bolts 17. Along its outer rim, the plate is provided with an annular boss 18 having therein a channel 19 which is semi-circular in section.

Joined to the rim of the plate by means of bolts 20 is a complementary annular member 21, and joined to said plate by bolts 17, but disposed centrally within said annular member 21, is a member 21a. Into an annular spacing between said members 21 and 21a fits a ring-shaped member, or, briefly, a ring, 24 which on one side has a semi-circular depression 25, its curvature being a continuation of the inner semi-circular surface of channel 19. On the other side, ring 24 is integrally connected to a rib 26. Located between the webbing 14 and said rib 26 is a flat, ring-shaped cam 27, the cam being affixed to said rib by screws 28 which also pass through the marginal portion of said webbing 14 so that the cam rotates with axle shaft 10 to which the webbing is connected by means of hub 13. It will be noted that the inner rim 28a of the cam is in an eccentric relation to axle shaft 10.

To complete this part of the description, I wish to add that hub 13 includes a disc-shaped member 30 forming an integral part thereof, and that webbing 14 is connected to said member 30 by means of bolts 31.

Affixed to the inner side of the wheel mounting, specifically, to the stationary plate 15, are two cylinders, generally identified by numerals 32 and 32a, respectively. The cylinders are diametrically alined, each of them being open at one end and including at that end an outwardly-turned flange 33 remaining in abutment with said plate 15 outside the annular boss 18. Bolts 20, already mentioned herein, hold the cylinders in place.

A transverse partition 33a divides each cylinder into two chambers, 34 and 35, said partition being provided with an axial aperture 36 which serves as a bearing for a movable rod 37. Disposed within what will be called the outer chamber, 35, is a piston 38 mounted upon one end of the rod, while the other end thereof is connected to a flat plate or stopper 39. The plate occupies a diametrical position in said cylinder, the side edges 40 of the plate fitting slidingly into grooves 41 in the wall of said cylinder. A slot 42 within the boss 18 permits said plate 39 to slide across the circular passage-way defined by channel 19 and said depression 25 in ring 24. At its outer end, each cylinder is closed by a cap 43 having therein an axial aperture 45.

Mounted upon the aforesaid member 21a, by means of screws 48, are two valves, generally identified by numerals 49 and 49a, respectively. Valve 49 is adapted to co-operate with cylinder 32, while valve 49a is adapted to co-operate with cylinder 32a. As both valves are identical in structure, I shall restrict my description to one of them. The valve includes a housing 50 containing an L-shaped chamber 51. One leg of the L-shaped formation of the chamber is provided with an inlet port 53 for admission of a liquid, such as oil, from a supply pipe 54. An outlet port 55 opens into a pipe 46. The latter, in turn, leads to a tubular member 62a which contains a one-way valve including a restricted passageway 63 normally closed by a ball 64 and an internal annular shoulder 65 spaced from said passage. A coiled spring 66 bearing at one end against said shoulder, bears at the other end against said ball, keeping the passageway 63 normally closed against the flow of any liquid from said member 62 into the said pipe 46.

The member 62 is joined by means of a short length of pipe 67 to a T-union 68. The latter contains a restricted port 69 which is controlled by a ball 70. The ball is connected by means of a rod 71 to the first-named ball 64 so that both balls may move in unison. The rod is supported within said T-union by means of a spider 72. I wish to state here that normally said ball 70 is in a spaced relation to said passageway or port 69.

Extending from the T-union 68 to the aperture 45 in the cap 43 of the cylinder 32a is a pipe 73. Joined to the T-union by means of a short pipe 74 is an L-union 75 which leads to another ball valve, generally marked 76. Here a ball 77 is adapted to block a narrow port 78 at one end of the valve to prevent a flow of liquid to said T-union, but to yield to the flow of liquid from said T-union. The ball 77 blocks the port 78 under the tension of a coiled spring 80.

A pipe 79 leads from said valve 76 to the master cylinder, which is not shown. The inner end of the piston 56 is adapted to block said inlet port 53, but a coiled spring 58 urges the piston outwardly to keep the inlet port normally open. The outer end of the piston projects at all times out of the housing for a yielding engagement with the inner rim of cam 27. Pipes 54, shown in Fig. 1 and Fig. 2, lead to a union joint 59 including a side port 60 for connection through said port with the master cylinder.

Finally, I shall refer to a piston 61 disposed in the passageway defined by channel 19 and the above-said depression 25. The piston is connected by means of a pin 62 to the ring 24, the pin extending laterally from the piston into the face of said depression 25, radially with respect thereto. Being so connected, the piston is adapted to be carried by said ring 24 in a circular path within the above-named passageway.

Now I shall describe the operation of the above-described mechanism.

It will be understood that the passageway is to be filled with oil or some other suitable liquid. As the wheel begins to rotate, the body of the oil is pushed by the piston, and, as normally the passageway is unobstructed, the piston moves freely following its circular path. When, however, it is desired to slow down the rotation of the wheel or to stop it entirely, a brake pedal is depressed, causing the master cylinder to force a quantity of oil towards cylinders 32 and 32a. However, admission of oil to said cylinders is controlled by valves 49 and 49a. As the wheel rotates, rim 29 of cam 27 depresses gradually first one piston 56 and then the other one which is diametrically opposed to it. On reference to Fig. 1, it will be noted that piston 61 is located directly above the axle shaft 10, and that the inner rim of cam 27 is in engagement with the outer end of piston 56. As this portion of the cam is at its widest, the piston of the top valve is depressed to its full extent till the outlet port 53 in said valve is closed. As no oil is forced into cylinder 32, the stopper 39 stays in its chamber 34.

At the opposite end, that is, in valve 49a, the situation is different. As the cam here is very narrow, piston 56 is in its outwardly-extended position when the inlet port 53 is open, permitting oil to be forced into chamber 52. Overcoming the tension of spring 47, the oil pushes piston 38 away from cap 43. As a result, stopper 39 is made to slide into the path of piston 61. It will be understood that the action of the cam is continuous, which means that the action of valves 49 and 49a is gradual so that at first very little oil is allowed to pass through a respective valve; then, as piston 56 slides outwardly of the valve, the quantity of oil passing through said valve is increased. This is followed by a decrease, as the cam works its way to complete a revolution about the axis of the wheel.

As the port 53 becomes closed by said piston 56, cutting off the inflow of oil through said port under pressure from the master cylinder, the coiled spring 47 in the cylinder 32a will push piston 38 towards the cap 43, forcing the oil contained in chamber 35 into the tube 73 and into the T-union 68. As the passageway 63 is closed by said ball 64, the oil will enter the L-union 75 through the duct 69, then through the duct 78 and the valve 76 it will pass into the pipe 79, leading to the master cylinder.

Figures 2, 3, 4:
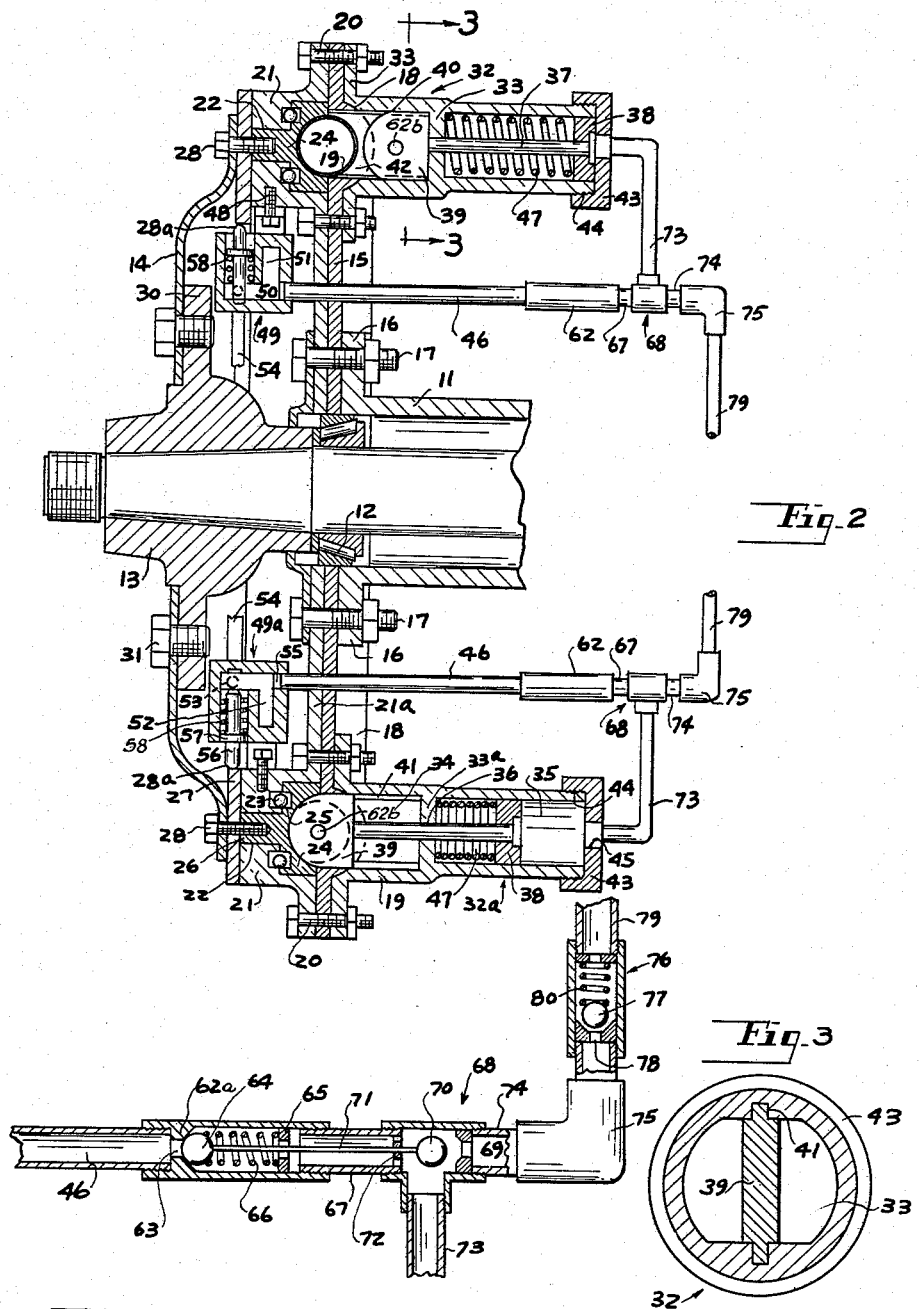
Fig. 2 is a sectional view of the wheel mounting and the braking means of my invention on line 2—2 of Fig. 1.
Fig. 3 is an enlarged sectional view on line 3—3 of Fig. 2.
Fig. 4 is an enlarged sectional view of oil-conducting pipes and valves forming a part of the operative mechanism of the brakes.

In Fig. 2, the stopper in the upper cylinder 32 is shown in its fully withdrawn position, while the stopper operated by the piston of the lower cylinder 32a is shown disposed fully across the path of the rotary piston 61 when only a restricted opening 62b permits oil to pass through said stopper. By the time said rotary piston has moved 90 degrees from its top position, the stopper of the top cylinder will have partly shifted into the channel occupied by said piston, while the stopper operated by the lower cylinder 32a will be partly withdrawn from said channel. By the time the rotary piston has covered another 90 degrees, the channel will be fully open at the bottom and fully blocked at the top. Because of these obstacles, the flow of oil, impeded thereby, will have a damping action upon the movement of the rotary piston and the wheel to which it is connected by intermediate means described above.

It will be understood that some changes may be made in the structure of my brakes, and that some elements may be substituted for the members shown by me, without departing from the inventive principle disclosed by me.

What I, therefore, wish to claim is as follows:

1. In an automotive vehicle including driving wheels each of which has an axle disposed in a cylindrical housing, brake means for individual wheels, the brake means for each wheel comprising a circular plate member affixed to the housing, the member being provided with an axial aperture therein for support of bearing means for said axle and with an annular channel within the marginal portion of said plate member, the channel being semi-circular in cross-section, a complementary rotary member having an annular recess facing said channel to form therewith a passageway, said rotary member being connected to the wheel for rotation therewith, a quantity of oil within said passageway, an annular member attached to the marginal portion of the plate member for a sliding abutment from outside with said complementary rotary member, a centrally-located member upon said plate member for a sliding abutment with the rotary member from inside, a piston attached to the rotary member and disposed within the passageway for movement therein about the axis of the axle, a pair of cylinders affixed to the circular plate member at right angle thereto, each opening into said passageway, the cylinders being disposed in a diametrical relation to each other, a movable piston in each cylinder, a plate-like stopper carried by said piston and adapted to be shifted crosswise into the passageway, spring means to normally keep the stopper in its inoperative position out of the passageway, stationary valve means operatively connected to each cylinder for admission of oil thereto from a source of supply to actuate the pistons, pipe means to supply oil under pressure to said valves, cam means carried by the wheel to gradually open or close said valves to control admission of oil to the respective cylinders, and pipe means provided with one-way valves to return the oil from the cylinders to the source of supply.

2. In an automotive vehicle including driving wheels each of which has an axle disposed in a cylindrical housing, brake means for individual wheels, the brake means for each wheel comprising a stationary circular plate axially mounted upon said housing, the plate having a laterally-depressed annular channel within its marginal portion, the channel being semi-circular in cross-section and facing the wheel, a marginal annular member affixed to the plate outside the channel, a disk-like center member affixed axially to said circular plate within the area defined by said channel, the center member being in a spaced relation to said marginal member, a complementary annular element connected to the wheel for rotation therewith, said element slidingly fitting into the spacing between the center member and the marginal member and being provided with an annular recess in register with the above-said channel to form a passageway therebetween, a quantity of oil within said passageway, a piston attached laterally to the rotary member and disposed within the passageway for movement therein, a pair of cylinders mounted on said circular plate in a diametrical relation to each other and opening into said passageway crosswise thereto, a movable piston in each cylinder, the piston carrying at one end a stopper in the form of a plate having an aperture therein materially smaller than the cross-section of the passageway, a valve operatively connected to each cylinder and controlled by a plunger, spring means within the valve to project the plunger outwardly to keep the valve normally open, means to supply oil under pressure to said valves and through said valves to the cylinders to actuate the pistons, cam means carried by the wheel and engaging said plungers of the valves to close these valves alternately, and pipe means including one-way valves by-passing the first-named valves to return the oil from the cylinders to the source of supply.

3. In an automotive vehicle including driving wheels each of which has an axle disposed in a cylindrical housing, brake means for individual wheels, the brake means for each wheel comprising a stationary member axially mounted upon said housing in a vertical plane and having an annular channel therein facing the wheel, a complementary member connected to the wheel for rotation therewith, the member being provided with an annular depression in register with the channel to form a closed annular passageway between the two members, a quantity of oil filling said passageway, a piston laterally affixed to the rotary member and disposed in the passageway for movement therein along a circular path, a plurality of cylinders mounted on the stationary member in even spaced relations therebetween, each cylinder opening at one end into said passageway, a piston in each cylinder, the piston carrying at one end a stopper adapted to be shifted by said piston crosswise into said passageway to retard flow of oil therein, a valve operatively connected to each cylinder, a source of supply of oil, pipe means to convey oil under pressure from said source to the valves and through the valves to the cylinders to actuate said pistons, spring means within each cylinder to keep the stoppers out of the passageway, a plunger within each valve, the plunger being adapted to close the valve against passage of oil therefrom into the cylinder, a spring bearing against the plunger to keep the valve open, cam means connected to the wheel for engagement with the plungers to depress them, one by one, against the tension of springs bearing against said plungers, thereby temporarily closing each valve in the course of each revolution of the wheel, and pipe means provided with one-way valve means to bypass said first-named valves and to return the oil from the cylinders to the source of supply.

References Cited in the file of this patent

UNITED STATES PATENTS

| 1,405,736 | Mitchell | Feb. 7, 1922 |
| 2,434,590 | Runde | Jan. 13, 1948 |

FOREIGN PATENTS

| 1,070,626 | France | Feb. 24, 1954 |